(12) United States Patent
Chang et al.

(10) Patent No.: US 7,245,654 B2
(45) Date of Patent: Jul. 17, 2007

(54) CARRIER SENSING, SIGNAL QUALITY AND LINK QUALITY IN A RECEIVER

(75) Inventors: Chao-Ming Chang, Taichung (TW); Tsung-Hui Chen, Hsinchu (TW)

(73) Assignee: Mediatek Inc., Hsinchu (TW)

( * ) Notice: Subject to any disclaimer, the term of this patent is extended or adjusted under 35 U.S.C. 154(b) by 803 days.

(21) Appl. No.: 10/352,872

(22) Filed: Jan. 29, 2003

(65) Prior Publication Data
US 2004/0146091 A1 Jul. 29, 2004

(51) Int. Cl.
*H04B 1/00* (2006.01)
(52) U.S. Cl. ...................................... 375/150; 375/343
(58) Field of Classification Search ................ 375/147, 375/150, 152, 316, 340, 343
See application file for complete search history.

(56) References Cited

U.S. PATENT DOCUMENTS 6,373,858 B1 * 4/2002 Soleimani et al. .......... 370/476
7,103,335 B2 * 9/2006 Hosomi .................... 455/234.1

* cited by examiner

*Primary Examiner*—David B. Lugo
(74) *Attorney, Agent, or Firm*—Thomas, Kayden, Horstemeyer & Risley (57) ABSTRACT

In a receiver, two low-pass equivalent signal detection criterions when the timing, phase and amplitude of the received signal are known and unknown, respectively, are provided for the detection of the presence of a Barker sequence in a received signal by Neyman-Pearson hypothesis testing rule. In addition, signal quality and link quality to measure the current quality of environments for signal reception are provided by the employment of a differential decoder and a Viterbi decoder in the baseband receiver.

4 Claims, 4 Drawing Sheets

CARRIER SENSING, SIGNAL QUALITY AND LINK QUALITY IN A RECEIVER

FIELD OF THE INVENTION

The present invention relates generally to a wireless communication method and system, and more particularly to carrier sensing, signal quality and link quality in a baseband receiver for an RF communication system.

BACKGROUND OF THE INVENTION

Wireless communications between separated electronic apparatus are widely used. For example, a wireless local area network (WLAN) is a flexible subsystem that may be an extension to, or an alternative for, a wired LAN within a building. In a wireless communication system, the propagation characteristics of the channel or medium through which signals traverse are important factors in the communication system. The medium affects or distorts the transmitted signal in different ways, for example by altering the amplitude and/or the phase of the frequency components. RF technique is well developed for wireless communications. For example, the IEEE 802.11 defines a standard to be followed by RF systems. However, a disadvantage in such system is that the transmitted signal may be significantly distorted by the RF medium as a result of the frequency-dependence of the medium in multipath propagation due to the reception of signal paths other than the line-of-sight (LOS) path. In mobile communication systems, multipath propagations may be the primary cause of distortion in received RF signals, especially in circumstances where there are obstructions in the signal path between the transmitter and receiver. Multipath is caused by the simultaneous reception of signals which result from the RF propagation from the transmitter through a medium with different paths. Particularly, in indoor environments a large number of multiple signal reflections occur when using wireless communication systems. These signal reflections result in a smearing of the signal in time, e.g., time dispersion, and self-jamming. This can adversely impact the performance of a straightforward waveform coding system. The varying path lengths cause differences in the respective received signals in relative delays, amplitude, and/or phase, which combine approximately linearly at the receiver. In general, multipath is a frequency dependent phenomenon, that is, its deleterious effects vary with frequency.

A modulation method used to combat multipath propagation is called spread spectrum. In a spread spectrum communication system, the bandwidth occupied by a digital data is expanded or spread in the transmitter by multiplying the data signal by a spreading signal or sequence. The spreading effect is collapsed in the receiver by the process of correlation. Since multipath is frequency dependent, only part of the spread signal is significantly perturbed. RF communication systems employing spread spectrum techniques are well known and widely used. For example, wireless LAN products frequently employ some type of spread spectrum techniques, such as direct sequence spread spectrum (DSSS) or frequency hopping spread spectrum (FHSS), to communicate between mobile stations and network access points (AP). A distinguishing feature of spread spectrum technique is that the modulated output signals occupy a much greater transmission bandwidth than the baseband information bandwidth requires. Prior art receivers employ matched filters to improve the detection of spread spectrum signals. Matched filtering technique uses an optimum receiver filter which has a frequency transfer function, $H^*(f)$, matched to the frequency transfer function, $H(f)$, of the channel, where $H^*(f)$ is the complex conjugate of $H(f)$.

Spread spectrum communications have been used for various applications, such as cellular telephone communications, to provide robustness to jamming, good interference and multipath rejection, and inherently secure communications from eavesdroppers, for example, in U.S. Pat. No. 5,515,396 to Dalekotzin. U.S. Pat. No. 6,115,411 to van Driest further frees the time interval in a spread spectrum encoder for a WLAN to increase the data rate in the communication system.

The spreading sequence is one type of reference signal in RF communications. It is known advantages to simultaneously transmit a reference signal along with the information-bearing signal in a transmitter system. There are various uses for the reference signal in the receiver system, for example, to accomplish baud and carrier synchronization with the transmitter system. The reference signal may also be used in determining the RF propagation impulse response. For example, U.S. Pat. No. 5,748,677 to Kumar provides a method and system for the simultaneous transmission and reception of a varying reference signal together with the composite data-modulated signal which represents the source message bit information to lower the power for the transmission of the reference signal and improvement of the determination of the transmitted reference signal.

Figure 1A:
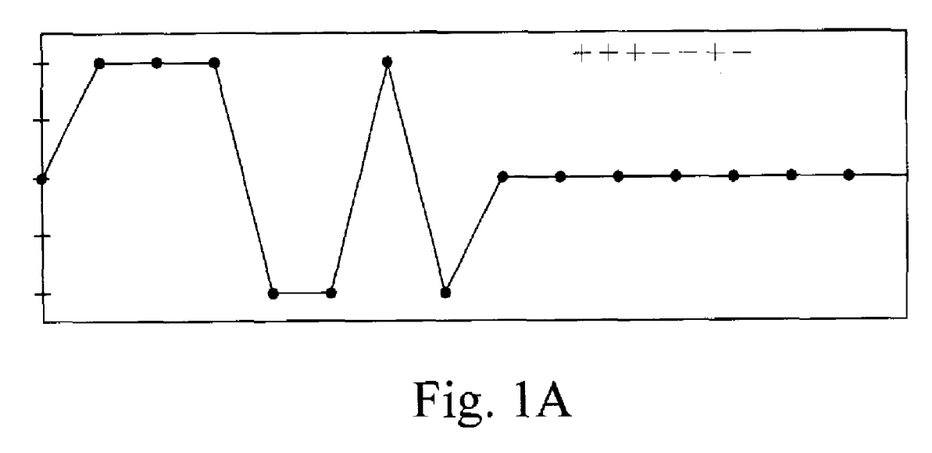
FIGS. 1A and 1B show a basic 7-bit Barker code and the auto-correlation on a one shot basis, respectively.
Figure 1B:
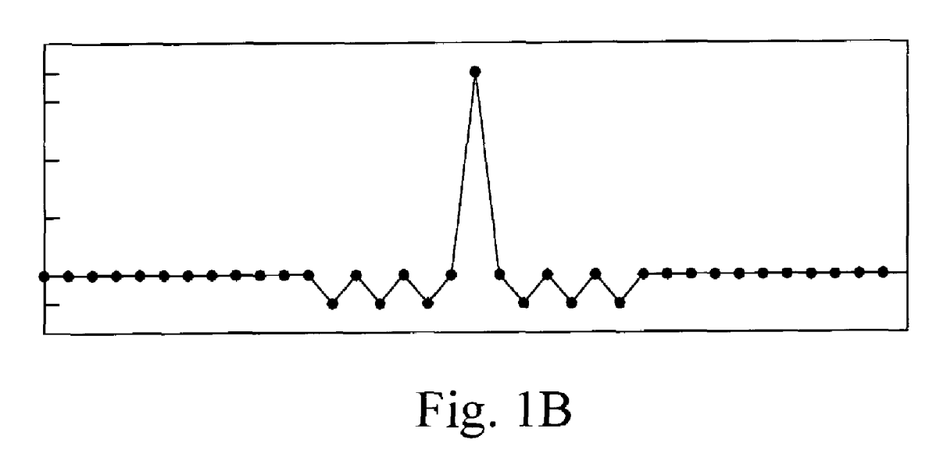

On the other hand, WLANs are usually based on a medium access control (MAC) using a listen-before-talk scheme such as the carrier sense multiple access with collision avoidance (CSMA/CA) as described by the IEEE 802.11 standard. The IEEE 802.11 standard for WLANs is a standard for systems that operate in the 2400–2483.5 MHz industrial, scientific and medical (ISM) band. The ISM band is available worldwide and allows unlicensed operation for spread spectrum systems. The IEEE 802.11 focuses on the MAC and physical layer (PHY) protocols for access points based networks and ad-hoc networks. It supports direct sequence spread spectrum (DSSS) with differential encoded BPSK (DBPSK) and QPSK, frequency hopping spread spectrum (FHSS) with Gaussian FSK (GFSK), and infrared with pulse position modulation (PPM). In particular, under IEEE 802.11b a receiver shall implement a channel clear assessment (CCA) procedure in order to indicate the status of the medium as busy or clear. This CCA mechanism can be achieved by measuring the received energy in the medium and/or by measuring a specific signal pattern in the medium. For the scheme of measuring the received energy in the medium, a technique is used to detect the starting edge of the incoming packet and accumulate received signal energy over some window of length L. An example using the received energy monitoring is provided in U.S. Pat. No. 5,987,033 to Boer et al. by a WLAN with enhanced capture provision. For the other scheme of measuring a specific signal pattern in the medium, there are several different varieties of spread spectrum codes could be used, and the most prominent among them are called m-sequence spreading signals or pseudo noise or PN codes. A variant of those is the Gold codes used in global positioning systems (GPS). There are also Kasami codes and Walsh codes used in IS95 systems, which are not strictly spreading codes but are also listed herewith for reference. In IEEE 802.11b, Barker sequence is the specific signal pattern for the CCA mechanism. The Barker codes were originally developed for radar systems, and they are actually a subset of PN codes and are short codes with a length up to 13. The property that makes them popular for radar system is what is called one-shot correlation, not the end of round correlation. This function has side lobes, e.g., correlation coefficients, of 0 and −1, and this is not the case of PN codes in general. FIGS. 1A and 1B show a basic 7-bit Barker sequence or codeword (+++−−+−) and the auto-correlation on a one shot basis, respectively, by which is shown the main peak at the center and a 0 and −1 cross correlations. As shown, in FIG. 1B, the exemplary timing diagram is for an ideal correlator output, and the Barker sequences causes a waveform spike and fixed-level sidelobes. However, the small sidelobes shown in FIG. 1B are for reference only. The size, shape and spacing of sidelobes are not intended to be to scale. The sidelobes are shown to demonstrate that a correlator generally has some small output value close to zero during symbol processing.

In the related arts, U.S. Pat. No. 5,184,135 to Paradise, U.S. Pat. No. 5,327,496 to Russell et al., U.S. Pat. No. 5,073,898 to Endo et al., U.S. Pat. No. 5,471,497 to Zehavi, and U.S. Pat. No. 5,371,760 to Allen describe the transmissions using PN sequences. U.S. Pat. No. 5,412,620 to Cafarella et al. utilizes a series of chips in a spread spectrum signal. U.S. Pat. No. 5,982,807 to Snell discloses a high data rate spread spectrum transceiver with enhanced overall system performance by use of modified Walsh codes. Further, U.S. Pat. No. 5,909,462 to Kamerman et al. provides a system and method for improved RF receivers that can be trained rapidly to the preamble portion of a data packet in order to use a minimum duration preamble and can be rapidly and accurately trained to a transmitted signal under poor channel conditions. U.S. Pat. No. 5,535,239 to Padovani et al., U.S. Pat. No. 5,416,797 to Gilhousen et al., U.S. Pat. No. 5,309,474 to Gilhousen et al., and U.S. Pat. No. 5,103,459 to Gilhousen et al. disclose CDMA spread spectrum cellular telephone communication systems using Walsh spreading codes. U.S. Pat. No. 6,219,356 to Beukema describes a method for multipath resistant waveform coding, which adds a chip extension to an optimally designed waveform set to compensate for an expected time shift in the radio channel during the transmission and demodulation of the transmitted waveform. The chip extension method can be used in BPSK, QPSK, QBPSK, and a modified Quadrature-BPSK encoding scheme.

There is a need to detect the Barker sequence in the channel or medium in a simple way. Further, it is convenient to report the quality of signal and link such that users can accommodate the physical environment timely to enhance the quality of transmission and receiving. However, prior arts never provide such quality services.

SUMMARY OF THE INVENTION

Accordingly, it is an object of the present invention to disclose a method and system to provide carrier sensing, signal quality and link quality in a baseband receiver for an RF communication system.

In a modeled scheme, the presence of a Barker sequence is determined by Neyman-Pearson hypothesis testing rule. With known or unknown amplitude, timing and phase of a received signal, respective criterions are derived in a simple format for the received signal to be compared with a designed threshold to thereby detect the Barker sequence.

Moreover, two approaches are proposed to measure the quality of signal and link which correspond to the quality of receiving in a differential detector and a Viterbi decoder in an embodiment baseband receiver for IEEE 802.11b. The signal quality is evaluated by monitoring the accumulated phase difference between continuous symbols of the received signal. By estimating the distance between the surviving path and the other paths merging to the final state in the Viterbi decoding, the link quality is provided.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 2:
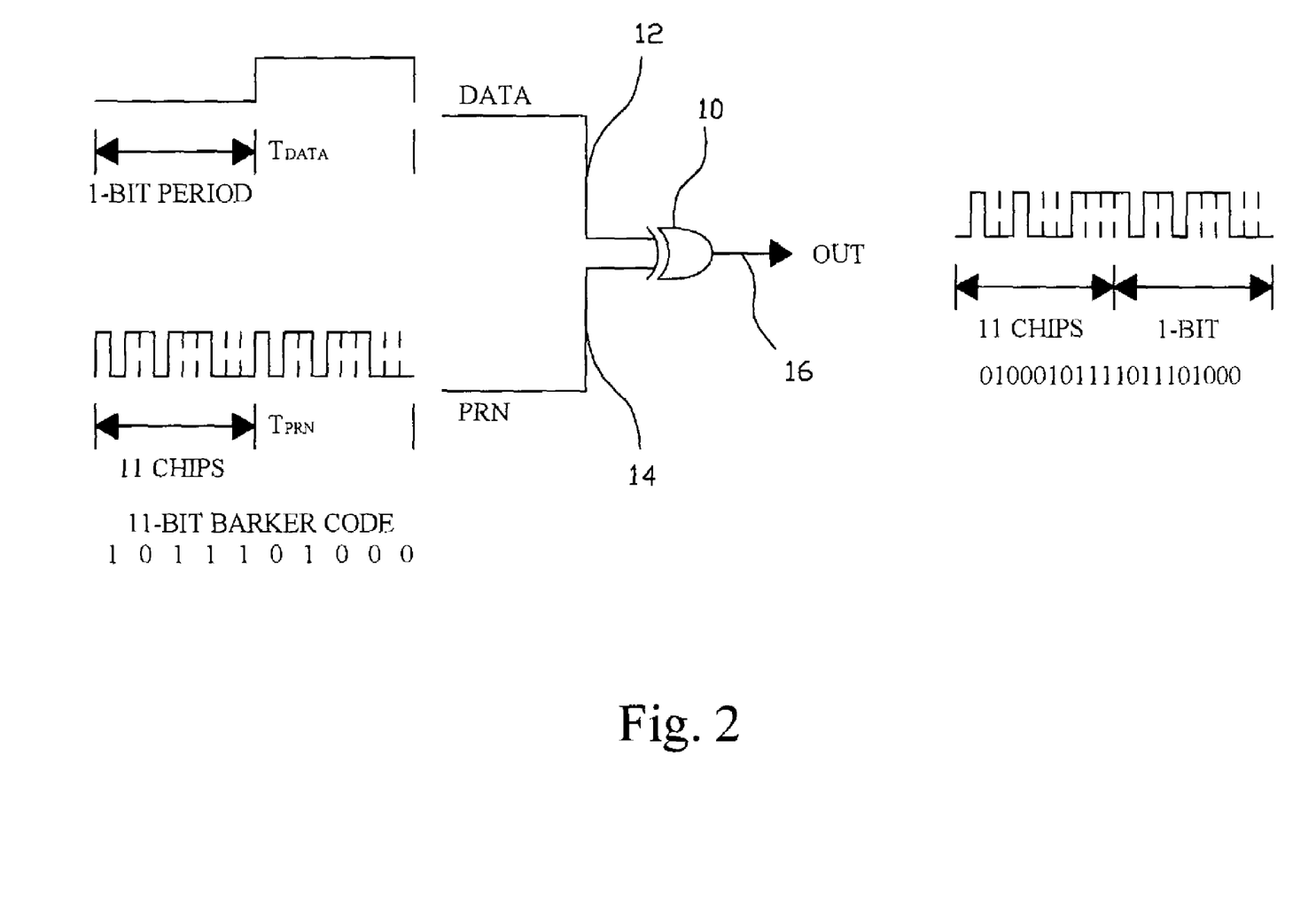
FIG. 2 shows the modulation of data and Barker sequence for the baseband signal in transmitter side.

To discuss the received baseband signal in a receiver system, the modulation of data and the Barker sequence for the baseband signal in a transmitter side is illustrated in FIG. 2 at first. As shown, an exclusive-OR gate 10 is used to combine the information-containing signal DATA and the PN codes PRN from its inputs 12 and 14 to produce a modulated signal OUT on its output 16. In this embodiment, DATA is a binary signal and PRN is a 11-bit Barker code following the IEEE 802.11b. One bit period $T_{DATA}$ of DATA equals to the total periods $T_{PRN}$ of 11 chips in a Barker code. The Barker code consists of eleven chips having the sequence "1011101000", in which the rightmost chip is output first in time. In a binary waveform coding, the waveform is formed from a sequence of N individual chip values which can take on values of 0 and 1. Typically, the waveform sequences are chosen from a fixed set of orthogonal sequences. Several encoding methods can be used to map data bits to waveform patterns. Examples of these methods include binary phase shift keying (BPSK), quadrature phase shift keying (QPSK), and quadrature BPSK (QBPSK). Typically, the PN signal PRN is unrelated to the transmitted bit sequence in the data source DATA and is stationary, i.e., the sequence of chip signals is the same for all symbol intervals. The Barker code consists of a sequence of chips having values of 0 and 1 (non-polar signal) that are exclusive-ORed with the information bits to be transmitted. A PN sequence is composed of a plurality of chip signals, whose polarity is determined by certain types of binary polynomials, and hence the chip signals are said to be modulated. However, the individual chip signals are not the PN signal, but the entire sequence of chip signals is. One entire Barker code sequence is transmitted in the time period occupied by an information-containing symbol. Thus, if the symbol rate is 1 M Baud, the underlying chip rate for the eleven chips in the Barker sequence is 11 MHz. By using the 11 MHz chip rate signal to modulate the carrier wave, rather than the original 1 M Baud information signal, the spectrum occupied by the transmitted signal is eleven times greater. Accordingly, the recovered signal in the receiver, after demodulated and correlated, comprises a series of sign-inverted Barker sequences representing binary logic "1" information bits and non-inverted Barker sequences representing binary logic "0" information bits. The composite or modulated signal OUT is then converted from a digital representation to an analog representation by a digital-to-analog converter (DAC), translated up to RF band, power amplified and transmitted out by an antenna. Prior art systems for transmitting an unmodulated spread spectrum signal together with a data-modulated spread spectrum signal in order to facilitate synchronization and demodulation are known.

Figure 3:
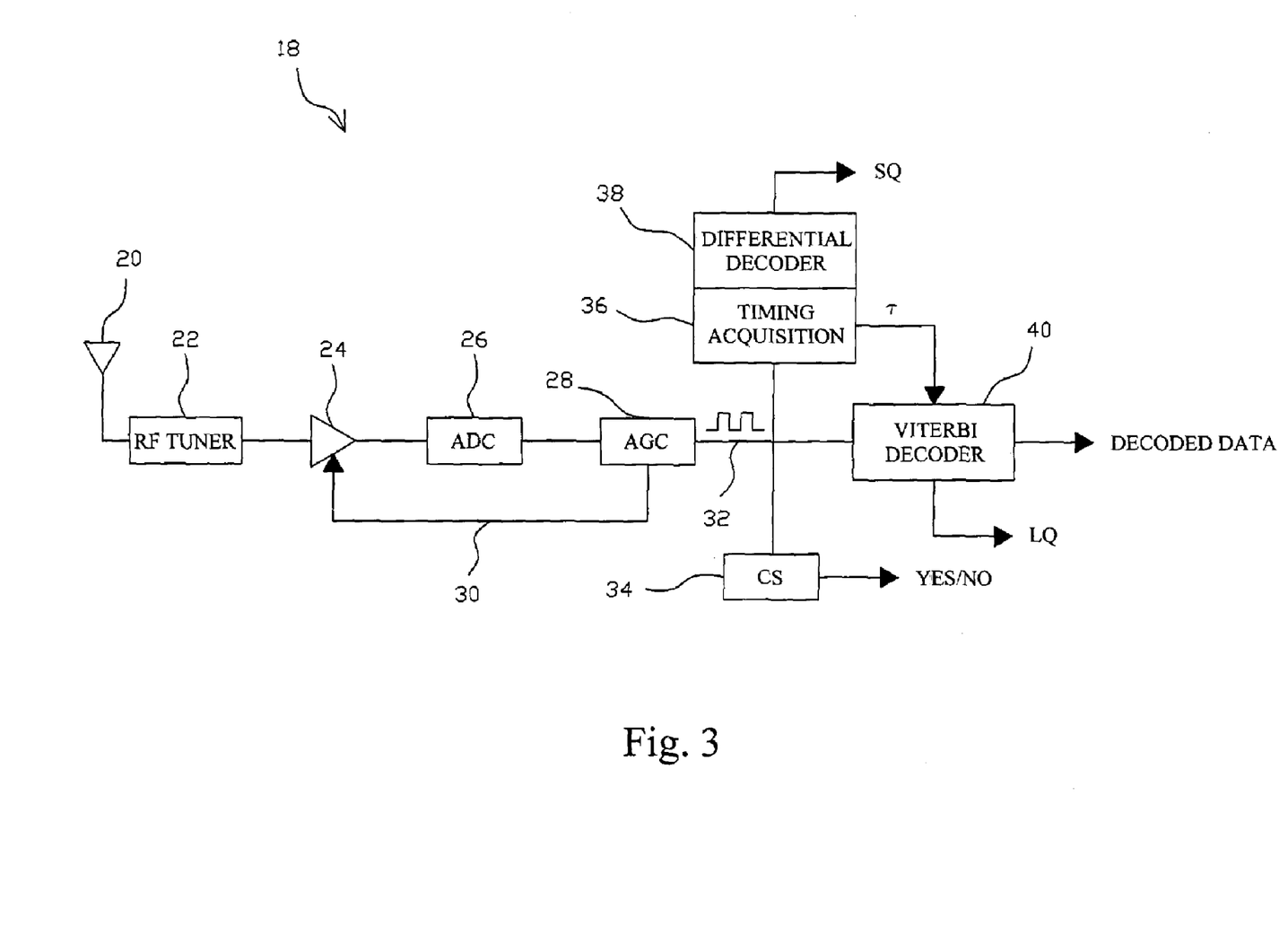
FIG. 3 shows the functional block diagram of an embodiment receiver system according to the present invention.

FIG. 3 shows the functional block diagram of an embodiment receiver system according to the present invention. In the receiver system, an antenna 20 is used to receive RF signals. The received RF signal, representing the data signal and the Barker sequence signal together (i.e. the overall composite signal), is first amplified and filtered with a bandpass filter in RF tuner 22 to remove interference and noise which is outside of the bandwidth of the transmitted overall composite signal. The received RF signal is typically frequency-translated to a lower frequency, known as the intermediate frequency (IF), for further processing, which simplifies the implementation. In some digital systems, the IF frequency is zero, which requires that the remaining processes be implemented with complex digital arithmetic (real and imaginary components). The low-frequency signal from the output of the RF tuner 22 is an analog signal, which is further amplified by a power amplifier 24 and converted from an analog representation to a digital one by an analog-to-digital converter (ADC) 26. The received and quantized signal is made synchronous with the transmitter in signal symbol frequency and carrier frequency. The synchronization also establishes the proper timing (i.e., phase relationship) for demodulation of the received composite signal. The frequency of the sampling clock for ADC 26 is typically synchronous with the frequency of the signal symbol (i.e. reciprocal of the symbol interval) and is an integer multiple of the baud frequency. For example, if the sampling rate of each ADC is twice the chip rate and each ADC is 8 bit wide, then an ideal (perfectly received) non-inverted Barker sequence will comprise twenty-two (22) 8-bit ADC samples. The receiver 18 also accomplishes the function of automatic gain control (AGC) 28 by sending a regulation signal 30 to regulate the power gain of the amplifier 24, so that the received signal energy is made to be approximately constant for subsequent processing. The AGC is a control scheme at the front-end of the demodulator to eliminate channel gain variations, which would affect the subsequent digital signal processing. The recovered digital signal 32 is provided for carrier sensing 34, timing acquisition 36 and Viterbi decoder 40. The carrier sensing 34 receives the signal 32 and determines that a carrier signal has arrived. In communication systems with matched-filter (correlation) demodulation, a metric known as the correlation sum is determined about a confined interval known as sampling point. Phase synchronization of the transmitter and receiver symbol intervals ensures that the sampling point is properly established. The timing acquisition 36 extracts the timing information τ and sends it to the Viterbi decoder 40. The timing acquisition 36 is a prior art. Further to the timing acquisition 36, the received digital baseband signal 32 is processed by a differential decoder 38 to generate a signal quality SQ as a system performance parameter, for example, to provide for MAC. To decode waveform coding modulation, the waveform interval in the received signal is processed using a correlator structure which evaluates correlations. Since the basis waveforms normally represent an orthogonal or near-orthogonal basis set, all of these correlations will result in a value of low correlation except for one, which provides a relatively larger correlation. The bit pattern which corresponds to the basis waveform giving the largest correlation at the receiver is taken as the estimate of the information encoded at the transmitter. The baseband waveform shape is shown as a perfect square wave for exemplary purposes only, and in practice will be smoothed with a band limiting filter so that it does not interfere with other possible users in the frequency domain. That is, the calculated correlation value should be small or zero for all waveform vectors except for the transmitted one, which will output a large value. The Viterbi decoder 40 to decode a received baseband signal to decoded data is also a prior art. However, the invented method generates a link quality LQ as a system performance parameter further from the Viterbi decoder 40.

In a wireless communication system, according to the present invention, the detection of the presence of a Barker sequence in a received signal, for instance received by the receiver in a transceiver or a mobile station, is modeled as a hypothesis testing problem and its performance depends on the statistics employed hereinafter. In particular, it is proposed a method to indicate the presence of a Barker sequence by Neyman-Pearson hypothesis testing rule, also known as a maximum likelihood binary decision rule, which is the optimum solution by maximizing the detection probability $P_d$ with a constrained false alarm probability $P_{FA}$. Generally, a false alarm is less severe error than not detecting a packet at all, and the reason is that after a false alarm the receiver will try to synchronize to non-existent packet and will detect its error at the first received data integrity check.

The transmitted and received low-pass equivalent signal model is provided under additive white Gaussian noise (AWGN) channel assumption. "Additive" means that the noise is superimposed or added to the signal. "White" noise has a power spectral density the same for all frequency of interest. "Gaussian" means that the probability density function of noise is Gaussian distributed. The purpose is to detect the presence of Barker sequence according to a sequence of received samples. Let $$s(t) \equiv \sum_{n=0}^{N_c-1} d(n)p(t - nT_c) \quad \text{(Equation-1)}$$

denotes the signature waveform composed by Barker sequence whose support is $[0, N_c T_c)$, where $\{d(n)|n=0, 1, \ldots, N_c-1\}$ is the Barker sequence, $T_c$ is the chip duration, and p(t) is the pulse shaping function with support $[0, T_c)$. A pulse shaping function is used to provide the capability of addicting the excess bandwidth beyond the theoretical minimum into original signal spectrum. The received lowpass equivalent signal is $$s(t) = \text{Re}\{s_l(t)e^{j2\pi f_c t}\} \quad \text{(Equation-2)},$$

where $s_l(t)$ is usually called the complex envelop of the real signal s(t), and is basically the equivalent lowpass signal. For a real-valued signal s(t) has a frequency content concentrated in a narrow band of frequencies in the vicinity of a frequency $f_c$, it is called a band-pass signal. The received baseband signal s(t) in Equation-2 can be written as $$r_{LP}(t) = \sum_{m=-\infty}^{\infty} b(m)\rho e^{j\tilde{\theta}} s(t - \tilde{\tau} - mT) + z_{LP}(t), \quad \text{(Equation-3)}$$

where $b(m) \not\in \{0\}$ when the Barker signal presents and $b(m) = \{0\}$ when the Barker signal does not present; $\rho$, $\tilde{\theta}$, and $\tilde{\tau}$ are the received magnitude, phase, and timing of the received Barker signal; $T \equiv N_c T_c$ is the symbol duration of the Barker signal; and $z_{LP}(t)$ is the received low-pass equivalent signal whose two-sided power spectral density is $N_0/2$.

1. Carrier Sensing (1) The low-pass equivalent signal detection criterion when the timing, phase and amplitude of the received signal are known By sampling the received signal $r_{LP}(t)$ at rate $2/T_c$, the sampled signal is $$r(m, n, q) = r_{LP}\left(mT + nT_c + q\frac{T_c}{2}\right) \quad \text{(Equation-4)}$$

$$= \rho e^{j\tilde{\theta}} b(m - \tilde{\alpha}_{n,q,\tilde{\tau}}) d\left(\left(n - \tilde{\beta}_{q,\tilde{\tau}}\right)_{N_c}\right) p\left(\left((q-l)\frac{T_c}{2} - \tilde{\tau}\right)_{T_c}\right) + z(m, n, q),$$

where $\tilde{\alpha}_{n,q,\tilde{\tau}} = \alpha$ if $-\alpha T \leq nT_c + qT_c/2 - \tilde{\tau} < -(\alpha-1)T$, $\tilde{\beta}_{q,\tilde{\tau}} = \beta$ if $-\beta T_c \leq (qT_c/2 - \tilde{\tau})_T < -(\beta-1)T_c$, and $z(m,n,q) \equiv z_{LP}(mT + nT_c + qT_c/2)$ is the sequence of independent and identically distributed zero-mean Gaussian random variables with variance $\sigma_N^2$. Without loss of generality and to ease the illustration, it is considered with a rectangular pulse shaping function $p(t)$ and therefore the received samples $r(m,n,q)$ is simplified as $$r(m,n,q) = \rho e^{j\tilde{\theta}} b(m - \tilde{\alpha}_{n,q,\tilde{\tau}}) d((n - \tilde{\beta}_{q,\tilde{\tau}})_{N_c}) + z(m,n,q) \quad \text{(Equation-5)}$$

for $n = 0, 1, \ldots, N_c - 1$ and $q = 0, 1$.

The hypothesis testing problem of detecting the presence of the Barker signal is therefore $H_0$: $r(m,n,q) = z(m,n,q)$ $H_1$: $r(m,n,q) = \rho e^{j\tilde{\theta}} b(m - \tilde{\alpha}_{n,q,\tilde{\tau}}) d((n - \tilde{\beta}_{q,\tilde{\tau}})_{N_c}) + z(m,n,q)$
(Equation-6)

for $n = 0, 1, \ldots, N_c - 1$ and $q = 0, 1$. The likelihood function based on the observation within a symbol duration is $$L(r) = \frac{\exp\left\{-\dfrac{\sum_{n=0}^{N_c-1}\sum_{q=0}^{1}\left|r(m,n,q) - \rho e^{j\tilde{\theta}} b(m - \tilde{\alpha}_{n,q,\tilde{\tau}}) d\left(\left(n - \tilde{\beta}_{q,\tilde{\tau}}\right)_{N_c}\right)\right|^2}{(2\sigma_N^2)}\right\}}{\exp\left\{-\dfrac{\sum_{n=0}^{N_c-1}\sum_{q=0}^{1}|r(m,n,q)|^2}{2\sigma_N^2}\right\}} \quad \text{(Equation-7)}$$

and the optimum test according to Neyman-Pearson criterion is $$\tilde{\delta}_{NP}(r) = \begin{cases} 1 & \text{if } L(r) > \eta \\ v & \text{if } L(r) = \eta \\ 0 & \text{if } L(r) < \eta \end{cases} \quad \text{(Equation-8)}$$

where $\eta$ is the designed threshold such that $$\gamma = Pr(L(r) > \eta | H_0) + vPr(L(r) = \eta | H_0) \quad \text{(Equation-9)},$$

where $\gamma$ is the assigned value which is the significance level of the test and $v \in [0,1]$.

(2) The low-pass equivalent signal detection criterion when the timing, phase and amplitude of the received signal are unknown It is not always the case that the prior information of the received timing, phase, and amplitude of the Barker signal is known beforehand. However, as extensively applied in the practical communications system, the AGC 28 provides the prior information of the received amplitude. Therefore, it remains to consider the hypothesis testing without the knowledge of received timing and phase.

When the received timing and phase are unknown, the simple hypothesis testing problem in Equation-6 becomes the composite hypothesis testing problem $H_0$: $r(m,n,q) = z(m,n,q)$ $H_1$: $r(m,n,q) = \tau e^{j\tilde{\theta}} b(m - \tilde{\alpha}_{n,q,\tilde{\tau}}) d((n - \tilde{\beta}_{q,\tilde{\tau}})_{N_c}) + z(m,n,q)$ $\theta \in [0, \pi)$ and $\tilde{\tau} \in [0, T)$ (Equation-10)

The likelihood function in this composite hypothesis testing problem is therefore $$L(r) = \frac{\int_0^T \int_0^\pi \exp\left\{-\dfrac{\sum_{n=0}^{N_c-1}\sum_{q=0}^{1}\left|r(m,n,q) - \rho e^{j\tilde{\theta}} b(m - \tilde{\alpha}_{n,q,\tau}) d\left(\left(n - \tilde{\beta}_{q,\tau}\right)_{NC}\right)\right|^2}{2\sigma_N^2}\right\} p(\theta) p(\tau) d\theta d\tau}{\exp\left\{-\dfrac{\sum_{n=0}^{N_c-1}\sum_{q=0}^{1}|r(m,n,q)|^2}{2\sigma_N^2}\right\}}, \quad \text{(Equation-11)}$$

where $p(\theta)$ and $p(\tau)$ are the prior distribution function of random variables $\theta$ and $\tau$, respectively. Supposing that $\theta$ and $\tau$ are uniformly distributed, Equation-11 becomes $$L(r) = \xi_1 \int_0^T I_0\left(\left|\sum_{n=0}^{N_c-1}\sum_{q=0}^{1} r(m,n,q)b(m-\alpha_{n,q,\tau})d((n-\beta_{q,\tau})_{N_c})\right|\right)d\tau$$

$$= \xi_2 \sum_{\tau \in \{k\frac{T_c}{2}|k=0,1,\ldots 2N_c-1\}} I_0\left(\left|\sum_{n=0}^{N_c-1}\sum_{q=0}^{1} r(m,n,q)b(m-\alpha_{n,q,\tau})d((n-\beta_{q,\tau})_{N_c})\right|\right),$$

(Equation-12)

where $I_0(\cdot)$ is the modified Bessel function of order zero, i.e., $$I_0(x) = \frac{1}{2\pi}\int_0^{2\pi} e^{x\cos\theta}d\theta,$$

and the second equality comes from the discrete-time nature of $\alpha_{n,q,\tau}$ and $\beta_{q,\tau}$ over $\tau$.

The corresponding optimum test without the knowledge of received timing and phase is $$\tilde{\delta}_{NP}(r) = \begin{cases} 1 & \text{if } L(r) > \eta \\ v & \text{if } L(r) = \eta \\ 0 & \text{if } L(r) < \eta \end{cases}$$

(Equation-13)

where $\eta$ is the designed threshold and $v$ is the randomized test factor defined previously.

In addition, due to the monotonously increasing property of $I_0(\bullet)$, the optimum test can be approximated by $$\tilde{\delta}_{NP}(r) = \begin{cases} 1 & \text{if } \hat{L}(r) > \eta \\ v & \text{if } \hat{L}(r) = \eta, \text{ where} \\ 0 & \text{if } \hat{L}(r) < \eta \end{cases}$$

(Equation-14)

$$\hat{L}(r) = \sum_{\tau \in \{k\frac{T_c}{2}|k=0,1,\ldots 2N_c-1\}} \left|\sum_{n=0}^{N_c-1}\sum_{q=0}^{1} r(m,n,q)b(m-\alpha_{n,q,\tau})d((n-\beta_{q,\tau})_{N_c})\right|.$$

(Equation-15)

That is, the likelihood statistic is the summation of the magnitude of Barker-correlated received samples for a symbol duration. In Equation-15, the operation to retrieve the magnitude of Barker-correlated output comes from the uncertainty of received carrier phase and the operation of summation over a symbol duration is used to average the unknown received timing.

2. Signal Quality and Link Quality

Both signal quality and link quality are the measures of current quality of environments for signal reception. Due to the employment of two decoders, i.e., the differential decoder 38 and the Viterbi decoder 40 as shown in FIG. 3, in the baseband receiver 18, it is proposed two measures named signal quality SQ and link quality LQ which corresponds to the receiving quality of the differential detector 38 and the Viterbi detector 40, respectively.

(1) Signal Quality

Figure 4:
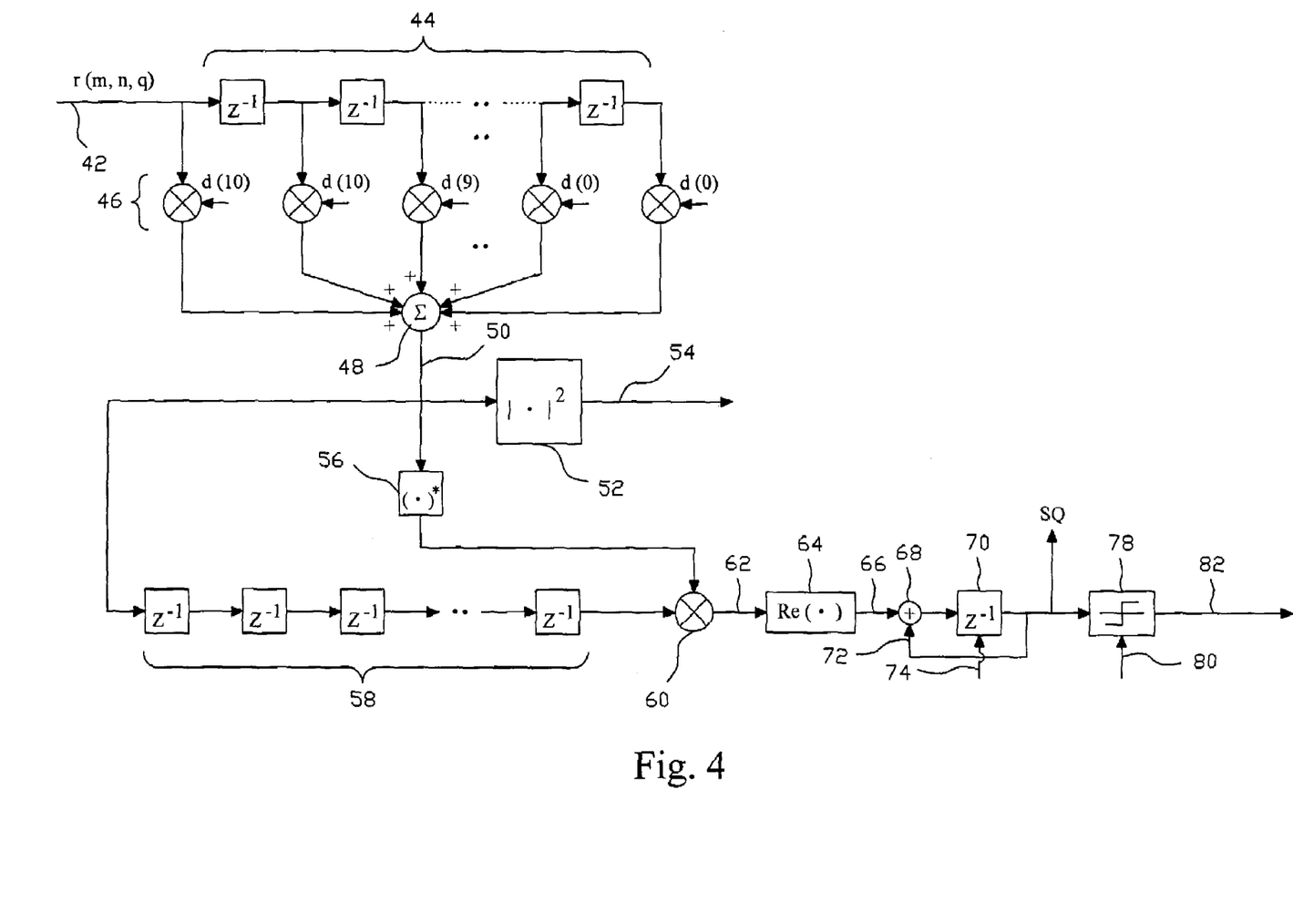
FIG. 4 shows an embodiment differential decoder to measure signal quality.

In the proposed baseband receiver 18 for IEEE 802.11b, a differential detector 38 is introduced to generate a training sequence for channel estimator within preambles. It is known of training the channel estimator in a receiver to improve the receiving performance of the receiver, such as the impulse response training. However, the new system performance parameter SQ and the algorithm employed are provided herewith by referring to the differential detection 38, one of whose exemplary block diagram is shown in FIG. 4. Theoretically, the differential detector decides the received information bit according to the accumulation of the phase difference between continuous symbols. The decoded bit is set to be 1 when this accumulated value is larger than 0 and is set to be 0 when this value is smaller than 0. The quality of this differential detector 38 can be measured by the magnitude of this accumulated value. Larger magnitude of this accumulated value implies less probability to decode erroneously and therefore the magnitude of this accumulated value is defined as the signal quality SQ in the baseband receiver 18.

In particular, in FIG. 4, the sampled signal r(m, n, q) on the input 42 is dispread or pattern matched by the combination of a series of delay units 44, a series of multiplying units 46, and a summing unit 48. The total number of the delay units 44 is twenty-one and the number of the multiplying unit 46 is twenty-two. The sampled signal r(m, n, q) and each output of the delay units 44 are multiplied by a respective chip of the Barker sequence as same as that for spreading the transmitted data. After dispreading, the output 50 of the summing unit 48 is squared by a square function 52 to generate a signal 54 for the timing acquisition 36 of FIG. 3. Moreover, the dispread signal 50 is differentially decoded by the combination of twenty-two delay units 58, a conjugate function 56, and a multiplying unit 60 to multiply the output of the delay units 58 by the conjugated dispread signal. The output 62 of the multiplying unit 60 is further extracted its real part by a real-part function 64. A summing unit 68 accumulates the output 66 of the real-part function 64 by adding the output 66 with the delayed accumulated signal 72 that is accomplished by passing the output of the summing unit 68 through a delay unit 70 and feeding it back to the summing unit 68. The delay unit 70 is reset every twenty-two samples by a reset signal 74. The signal quality SQ is taped from the output of the delay unit 70. A decision unit 78 is further used to generate a differential detection output 82. Likewise, the decision unit 78 is activated by signal 80 to make the binary decision every twenty-two samples.

(2) Link Quality

On the other hand, when the channel bandwidth is close to the signal bandwidth, the spreading will exceed a symbol duration and cause signal pulse to overlap. In DSSS systems, if the channel bandwidth is close to the signal spectrum which has been spread by some PN code, then the spreading effect of channel will exceed a chip duration and cause chip pulse to overlap. The decoding of payload is implemented by a decision-feedback Viterbi decoder 40 which mitigates both the inter-symbol interference (ISI) and inter-chip interference (ICI), effectively. Therefore, it is proposed an another measure for Viterbi decoder 40 to respond the quality of payload reception. In the Viterbi decoding, all the paths merge to a final state (denoted by state 0) eventually and therefore the distance between the paths merging to the final state decides the quality of detection of the Viterbi decoder. In the baseband receiver 18, it is defined the minimum distance between the surviving path and the other paths merging to the final state as the link quality LQ.

For example, in the decoding of DBPSK signal spread by Barker sequence, there are only two paths in the trellis diagram and the link quality LQ is the distance between these two paths when emerging to the final state.

As a result, it is convenient to report the quality of signal and link such that users can accommodate the physical environment timely to enhance the quality of transmission and receiving.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A method for carrier sensing in an RF communication system incorporating a Barker sequence for spreading a data signal, said method comprising the steps of:

receiving a baseband digital signal converted from an analog RF signal; sampling said baseband digital signal at a sampling rate;

detecting said Barker sequence by a hypothesis testing rule;

deriving a likelihood function based on said detection of Barker sequence within a symbol duration; and determining a presence of said Barker sequence by comparing said likelihood function with a threshold.

2. A method according to claim 1, further comprising defining said hypothesis testing rule with a known amplitude, timing and phase of said baseband digital signal.

3. A method according to claim 1, further comprising defining said hypothesis testing rule with a known amplitude and an unknown timing and phase of said baseband digital signal.

4. A method according to claim 3, further comprising defining said unknown timing and phase to be uniformly distributed.

* * * * *